Figure 1:
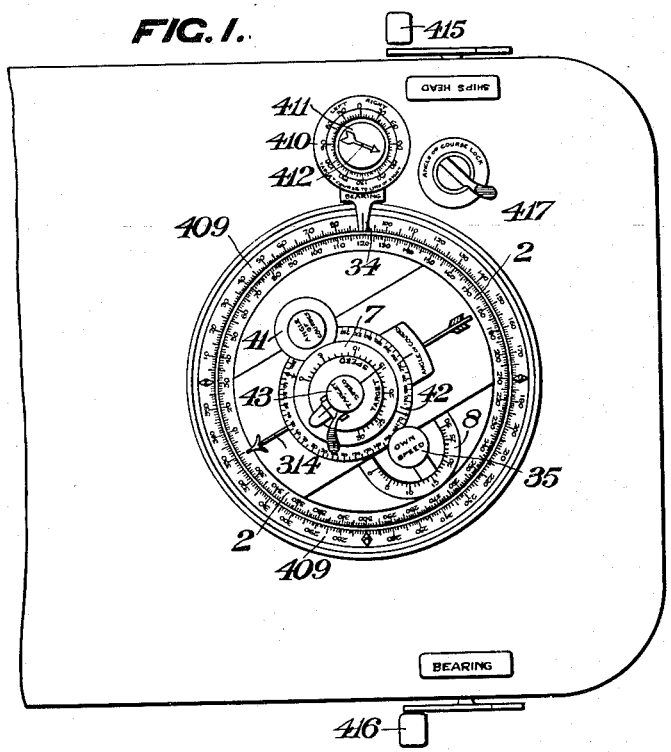

A. H. POLLEN & H. ISHERWOOD.
RANGE CLOCK.
APPLICATION FILED APR. 14, 1914.

1,162,511.

Patented Nov. 30, 1915.
3 SHEETS—SHEET 1.

A. H. POLLEN & H. ISHERWOOD.
RANGE CLOCK.
APPLICATION FILED APR. 14, 1914.

1,162,511.

Patented Nov. 30, 1915.
3 SHEETS—SHEET 2.

Attest:
N. R. Mannin
N. J. Reiter

Inventors:
Archur H. Pollen
Harold Isherwood
V. J. Rogers, Kennedy & Campbell Attys.

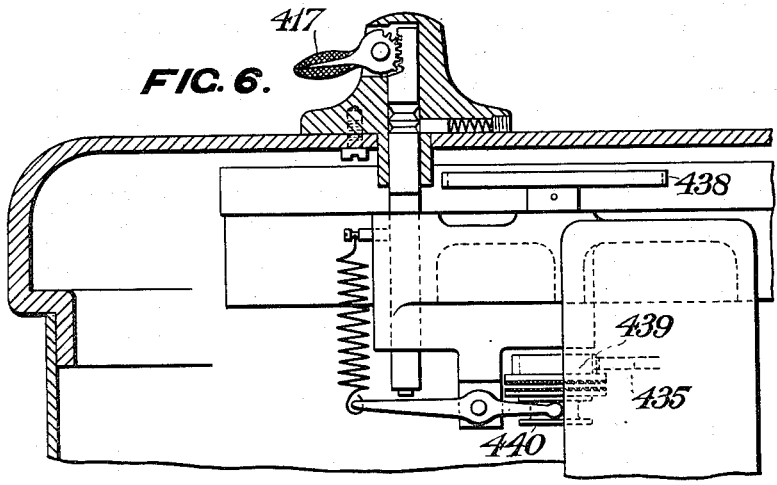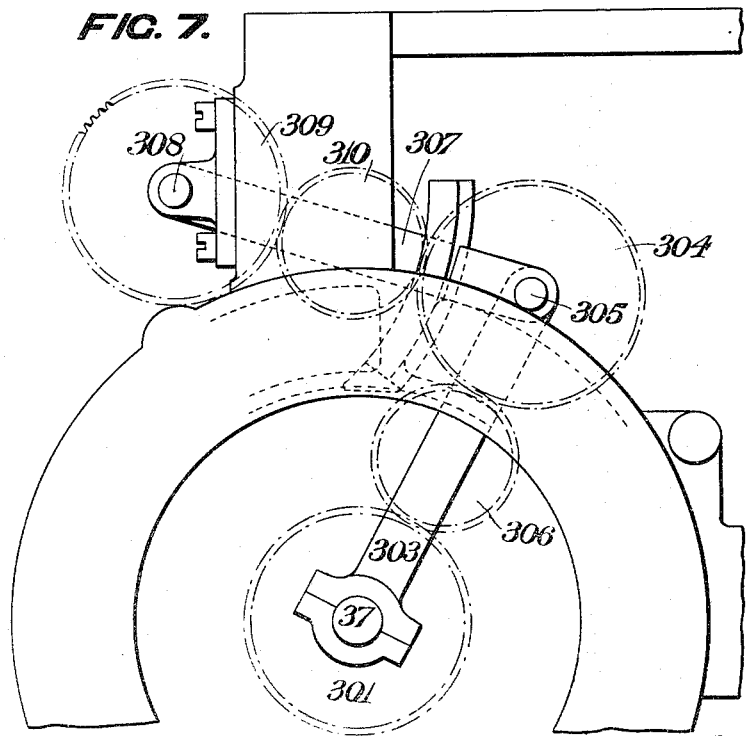

UNITED STATES PATENT OFFICE.

ARTHUR H. POLLEN, OF LONDON, AND HAROLD ISHERWOOD, OF YORK, ENGLAND.

RANGE-CLOCK.

1,162,511.  Specification of Letters Patent.  Patented Nov. 30, 1915.

Application filed April 14, 1914. Serial No. 831,702.

*To all whom it may concern:*

Be it known that we, ARTHUR HUNGERFORD POLLEN and HAROLD ISHERWOOD, subjects of the King of Great Britain, residing at 14 Buckingham street, Strand, London, England, and Bishophill House, York, England, respectively, have invented certain new and useful Improvements in Range-Clocks, of which the following is a specification.

This invention relates to improvements in range clocks for use at sea of the type in which the range and bearing of the target are indicated on a dial or its equivalent in a continuous manner, although the observations of the target obtained at the range finder may be intermittent observations, and consists of means whereby the indications of target bearing and target course are caused to be correctly maintained during the execution of a change of course by the ship on which the clock is mounted and from which the observations are being made.

In a clock of this type, as disclosed in our co-pending application, Serial No. 788,266, and to which the present improvements apply, a shaft is caused to rotate, by means, which it is not now necessary to describe, at a speed representing the rate of change of bearing and such drive is transmitted to the bearing dial so that the bearing dial automatically indicates the bearing of the target relative to the keel line of the ship. The bearing dial graduated in degrees of target bearing carries an arrow which represents the direction of the ship's head and which coincides with the zero graduation on the dial. A pointer fixed on the clock reads against the dial and the fixed line in the clock joining the center of the target to the indicating pointer represents the line of sight or the line joining the ship to the target. A subsidiary dial called the "target course dial" indicates by the position of an arrow engraved on it, the angle which the target course makes with the line joining the ship and the target, such target course dial is mounted on and carried by the bearing dial.

When the course of the ship is altered the bearing of the target will alter, but the angle between the line of sight and the target course will not alter and it has already been proposed in a clock of the type referred to, to maintain the position of the target course dial fixed in the clock, while the bearing dial rotates consequent on the changes of bearing of the target produced by the alteration of the course of the ship, that is to say, that during the execution of a turn by the ship the angular position of the target course dial has been maintained fixed in the clock. This has been effected by means of a parallel linkage connecting the target course dial with a wheel in the clock pivoted on a fixed axis and constrained, by means of the parallel motion aforesaid to remain parallel to the target course dial. A small lever has been provided for locking such wheel and therefore preventing the target course dial from rotating during the performance of a turning movement by the ship.

The present invention relates to an improvement on the aforesaid mechanism whereby the maintenance of the proper readings and indications of the clock is facilitated during the execution of a turning movement.

We proceed to describe as much of the earlier clock as is necessary for enabling the present improvement to be understood and the new parts that are introduced into the mechanism in carrying out such improvements, are lettered with numbers higher than 400, so that when reading the description it will be clear which parts of the mechanism relate to the present invention.

The material portions of the clock to which the improvements are applied are shown in Figures 1 to 6 in which—

Figure 2:
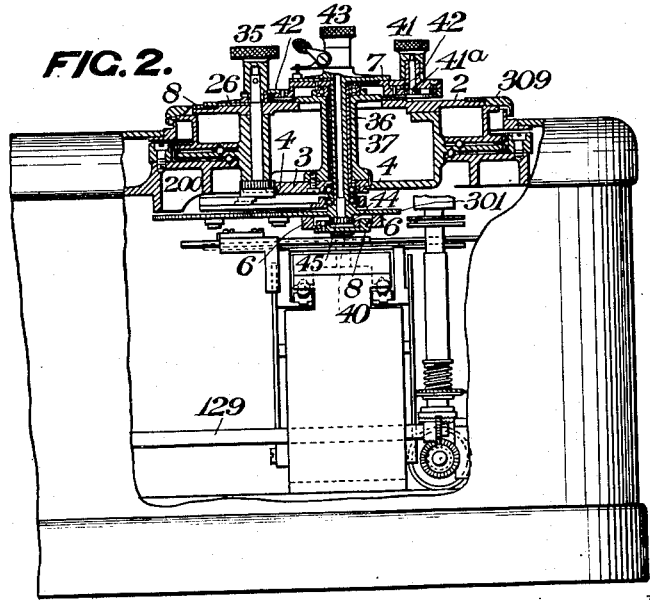
Figure 3:
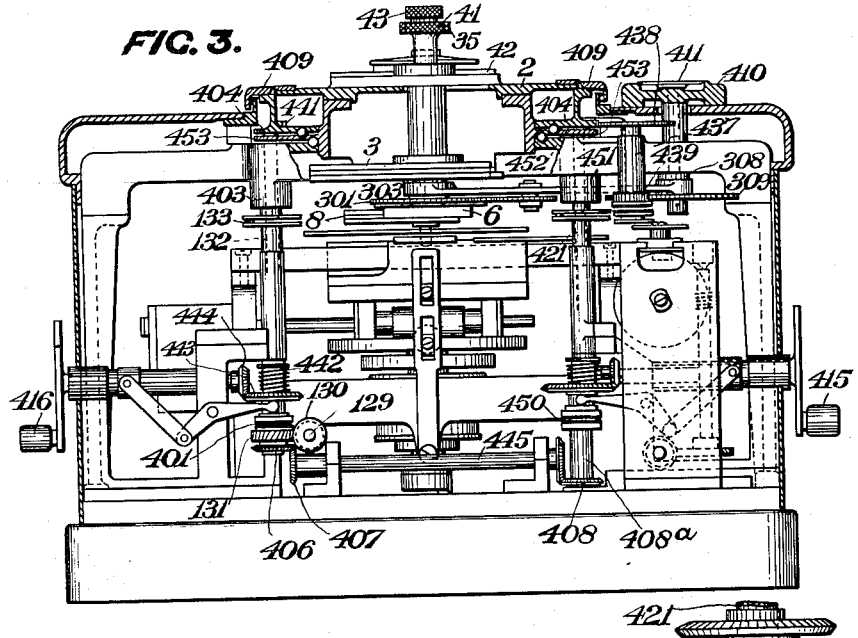

Fig. 1 is a plan of the improved bearing dial and its accessory apparatus. Fig. 2 is a sectional elevation of the same mechanism. Fig. 3 is a sectional elevation at right angles to Fig. 2, and Figs. 4, 5 and 6 show certain details of construction. Fig. 7 shows the mechanism employed for maintaining certain parts of the clock in the desired positions when the ship is executing a turn.

Referring first to Fig. 1, 2 is the bearing dial reading against the fixed bearing pointer 34. The bearing dial carries an arrow 314 which indicates the direction of the ship's head. It also carries a knurled head 35 adapted to set up the speed of the ship and a knurled head 41 adapted to set up the target course. It also carries a knurled head 43 for setting up the speed of the target. A dial 42 reading against a mark coinciding with the direction of the arrow 314, shows the angle between the course of the ship and the course of the target. So far the dial is identical with the bearing dial of the clock to which this invention applies and which will for convenience, hereafter be called the "Original clock"

According to the present invention a second dial 409 known as the compass dial is rotatably mounted outside the bearing dial and a dial 410 whose center is on the line joining the center of the bearing dial to the bearing pointer 34, that is to say, whose center is on the line of sight or the line joining the ship and the target, is arranged to serve as an indication of the angle between the target course and the line of sight.

We now proceed to describe the use of and mode of operation of the improved clock provided with compass dial. We shall then describe the mechanism by which the necessary inter-action of parts is obtained. It has already been explained that in the original clock the target course dial 42 was connected by a parallel motion to a wheel pivoted in a fixed position in the clock, such wheel is centered at the center of the dial 410 and carries with it the disk 411 on which is engraved the arrow 412. It follows that the arrow 412 and the arrow engraved on the target course dial 42 always remain parallel to one another.

It will be seen on reference to Fig. 3 that on one side of the clock is a handle 415, and on the other side a handle 416. By mechanism which will be described hereafter the handle 416, when pressed inward and turned by hand, disconnects the automatic drive and rotates the compass dial 409 and the bearing dial 2 as a solid body. The handle 415 on the other side when pressed in, disconnects the automatic drive and turns the bearing dial only within the compass dial. Normally the automatic action of the clock rotates the compass and bearing dial together as a solid body at a rate representing the rate of change of bearing.

In the operation of the improved range clock, according to this invention we mount a compass in close proximity to the clock, and the operator, begins operations by setting the bearing dial within the compass dial, so that the arrow 314 on the bearing dial, reads against the compass course of the ship on the compass dial. This is done by handle 415. He then proceeds to turn both dials together by means of handle 416 until the bearing of the target is indicated by the pointer 34. If the ship's speed has been correctly set on knurled head 35 and the target course has been correctly set on knurled head 41 and the target speed has been correctly set on knurled head 43 the result will be to cause the shaft 129 within the clock to be rotated at a rate representing the rate of change of bearing. As the mechanism by which this result is obtained forms no part of the present invention it is not necessary to describe it in this specification. By gearing hereafter to be described the shaft 129, normally transmits its motion to the bearing dial 2 and compass dial 409 and causes these two dials to rotate as a solid body at such a rate that the bearing of the target will continue to be correctly indicated against the pointer 34, this angle representing the angle between the keel line of the ship and the target. At the same time the compass bearing of the target is indicated on the compass dial against the pointer 34. Moreover the angle between the target course and the line of sight will continue to be indicated on the dial 410. When at any time the course of the ship is changed the operator by means of handle 415 rotates the bearing dial within the compass dial so as to indicate the altering course at each moment as obtained from the compass beside him, or we may effect the same purpose gyroscopically as will be hereinafter described, or if the ship is fitted with an Anschutz or similar gyroscopic compass we may use a corresponding receiver to maintain indications of ship's course on the compass dial correctly. In this way all the indications of the clock are correctly maintained both before, during and after the execution of a change of course by the ship.

We now proceed to describe the mechanism by which the various drives are communicated to the bearing dial 2, compass dial 409 and dial 410 indicating the angle between the target course and the line of sight.

Referring to Fig. 2 the construction of the compass dial and bearing dial and the parts mounted thereon is as follows:—The bearing dial carries beneath it a slide or way 4 in which slides the block 3. The rotation of the bearing dial as a whole carries the slide 4 around the center of the bearing dial and the block 3 can be displaced radially along such slide or way by means of knurled head 35 acting through the pinion 200 on a rack cut in the block 3. The knurled head 35 is employed to set the ship's speed on the machine. The block 3 carries the vertical tubular member 36 which is also displaceable radially with the block 3. The member 36 carries a concentrically mounted tubular member 37 on which is mounted the radial ways 6. In the ways 6 slides the member 8 carrying the pin 40. In the original as in the improved clock, the positioning of the pin 40 in this manner determines the rotation of the shaft 129 in such a way that the shaft 129 is caused to rotate at a speed representing the rate of change of bearing. It will be seen that the block 3 can be shifted radially in the bearing dial by the knurled head 35 to set up ship's speed. The ways can be rotated by means of the knurled head 41 and gears 41ᵃ to set up target course, and the block 8 carrying the pin 40 can be shifted radially in the ways 6 by means of the knurled head 43 operating through the pinion 44 and rack 45 to set target speed. Thus when these settings have been obtained the shaft 129 is caused to rotate at a speed representing rate of change of bearing and such rotation is employed to drive the compass and bearing dials in a manner now about to be described.

Referring to Fig. 3 the shaft 129 is seen in end view toward the bottom left hand corner of the machine. Mounted thereon is a worm 130 driving the worm wheel 131 loose on the shaft 132. The member 442 is slidably but not rotatably mounted on the shaft 132 and is normally held downward by a spring so that consequently shaft 132 is driven through the clutch 401. When the handle 416, however is pressed inward the member 442 is raised on the shaft 132, the clutch 401 is disengaged and the bevel wheel 443 engages the bevel wheel 444. Thus when the handle 416 is pressed inward the drive is transferred from the automatic shaft 129 and the shaft 132 can then be rotated in either direction by hand. As soon however as the wheel 416 is released the automatic drive from shaft 129 is resumed. The shaft 132 carries at its upper extremity a dog-clutch 133 by which it is connected with the shaft 403, the shaft 403 carries at its upper extremity a pinion 441 which engages with a spur wheel 404, rigidly attached to the compass dial 409 which runs on the ball race 405. Keyed to the lower end of the shaft 132 is a bevel wheel 406 gearing with a bevel wheel 407 on a shaft 445 which runs horizontally across the base of the machine and drives a bevel wheel 408 formed on a piece 408ᵃ loose on the shaft 421 and carrying the clutch member 450 at its upper extremity. As has already been described with reference to the shaft 123, the shaft 421 is normally automatically rotated from shaft 129 through bevel gear 406, 407, shaft 445 and bevel gear 408 and clutch 450. When however the handle 415 is pressed inward this drive is disconnected and the drive from the handle 415 substituted. The shaft 421 transmits motion through a dog-clutch to a shaft 451 carrying a pinion 452 at its extremity which engages with a spur wheel 453 carried by the bearing dial.

The effect of the mechanism just described is as follows:—Normally the shaft 129 drives the compass dial 409 through the shaft 132 and the bearing dial 2 through the shaft 421 so that both the compass dial and bearing dial normally rotate as a solid body. On pressing the handle 416 inward both dials can be rotated or set as a solid body by hand and on pressing the handle 415 the bearing dial alone is rotatable within the compass dial by hand.

As already mentioned the tubular member 37 which carries the ways 6 is provided with a gear wheel 301 which forms the first member of a parallel motion mechanism shown in Fig. 7, the final member being the wheel 309 mounted on the shaft 308 as clearly shown in Fig. 3. These wheels are carried in the well known way on arms 303 and 307 and the complete train of wheels is shown in plan in Fig. 7.

Referring to Fig. 7 a spur wheel 301 is carried on the axis 37 which carries the ways 6 of the target course dial. Pivoted loosely on such axis 37 is an arm 303 which carries a spur-wheel 304 pivoted at 305. An idle wheel 306 also pivoted on the arm 303 engages with the wheels 301 and 304. An arm 307 is pivoted to the arm 303 at 305 and is itself pivoted to the frame of the machine at 308. A spur wheel 309 is also pivoted at 308 and an idle wheel 310 also pivoted on the arm 307 engages with the wheels 304 and 309. The result of this parallel motion mechanism is that the wheel 309 carried on the shaft 308 always remains in strict parallelism with the target course dial 42 carried on the tubular member 37. On the top of the shaft 308 is mounted the disk 411 on which is engraved the arrow 412 which reads against the dial 410 indicating the angle between the target course and the line of sight.

As before mentioned the compass dial 409 carries a spur wheel 404. Meshing with the spur wheel 404 is a spur wheel 438 mounted on the shaft 437. Loose on the shaft 437 is the spur wheel 439 adapted to be held fast thereon at will by means of the clutch mechanism 440 operated from the handle 417 shown in Fig. 1. The details of this clutch mechanism are shown in Fig. 6 and require no further description. The spur wheel 439 is therefore made to move with the compass dial or to run free thereof at will. The spur wheel 439 meshes with the wheel 309 on the shaft 308 and the ratio of the gear train between the wheel 309 and the compass dial is arranged to be a 1 to 1 ratio. It will be remembered that the wheel 309 rotates with the target course dial and consequently when the clutch mechanism 440 is brought into operation the target course dial is forced to move with the compass dial, but when such clutch mechanism is released there is no constrained relationship between their motions. Thus when the clutch is in operation the target course dial must rotate at the same rate as the compass dial 2. This insures the condition which must obtain when both ships are on a steady course, namely that bearing dial, compass dial and target course dial all move together.

Figure 4:
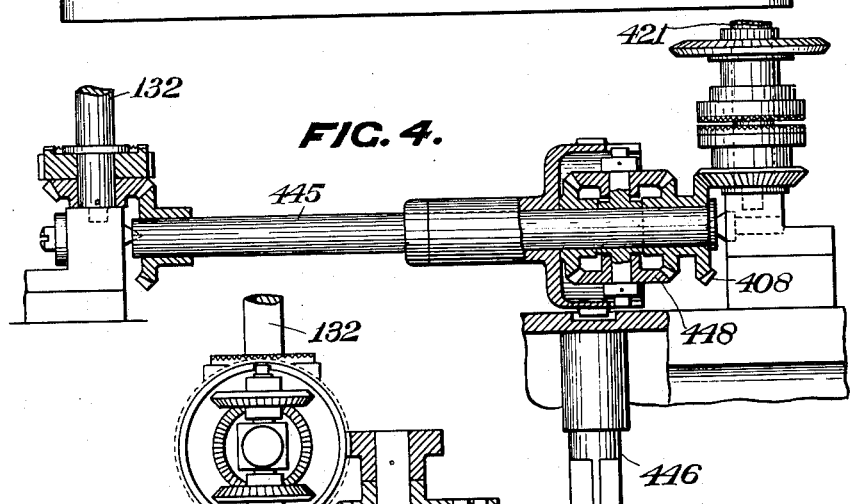
Figure 5:
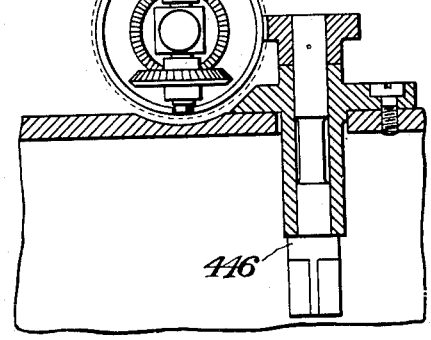

We may arrange the clock so that the direction of the ship's course on the clock is controlled automatically by a gyroscope or Anschutz receiver or other suitable equivalent and the means for doing this are shown in Figs. 4 and 5. The shaft 446 is controlled from the gyroscope so that its rotations are proportional to the change of course.

By means of a differential the rotation of this shaft can be added to or subtracted from the rotation of shaft 445 so that the bevel wheel 408 obtains the motion of shaft 445 plus or minus a motion transmitted from shaft 446. This is done in the well known way as clearly shown in Fig. 5, by driving the intermittent member or casing of the differential which carries the idle pinions from the shaft 446 by skew gear or any other suitable way, the bevel wheels with which the idle wheels gear being respectively fast on the shaft 445 and in one with the bevel 408. Thus the additional motion due to shaft 446 is transmitted through shaft 421 to the bearing dial in this way. Any alteration in the course of the ship is thus automatically taken care of and transferred to the bearing dial.

What we claim is:—

1. A range and bearing clock for indicating automatically the instantaneous bearing of a target relatively to a ship, comprising a compass dial and a bearing dial within said compass dial, means for setting said bearing dial to the course of the ship, means for setting both said dials together to the compass bearing and the keel line bearing of the target respectively, and means for rotating both dials together at a speed representing the rate of change of said bearing.

2. A range and bearing clock for indicating automatically the instantaneous bearing of a target relatively to a ship, comprising a compass dial and a bearing dial within said compass dial, means for setting said bearing dial to the course of the ship, means for rotating said bearing dial within said compass dial for changes of course of said ship, means for setting both said dials together to the compass bearing and the keel line bearing of the target respectively, and means for rotating both dials together at a speed representing the rate of change of said bearing.

3. A range and bearing clock for indicating automatically the instantaneous bearing of a target relatively to a ship, comprising a compass dial and a bearing dial within said compass dial, means for setting said bearing dial to the course of the ship, means for rotating said bearing dial manually within said compass dial for changes of course of said ship, means for setting both said dials together to the compass bearing and the keel line bearing of said target respectively, and means for rotating both dials together at a speed representing the rate of change of said bearing.

4. A range and bearing clock for indicating automatically the instantaneous bearing of a target relatively to a ship, comprising a compass dial and a bearing dial within said compass dial, means for setting said bearing dial to the course of the ship, means for rotating said bearing dial automatically within said compass dial for changes of course of said ship, means for setting both dials together to the compass bearing and the keel line bearing of said target respectively, and means for rotating both dials together at a speed representing the rate of change of said bearing.

5. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for setting said bearing dial to the course of the ship, means for setting both said dials together to the compass bearing and the keel line bearing of said target respectively, and means for rotating both dials together at a speed representing the rate of change of said bearing.

6. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for setting said bearing dial to the course of the ship, means for rotating said bearing dial within said compass dial for changes of course of said ship, means for setting both said dials together to the compass bearing and the keel line bearing of the target respectively, and means for rotating both dials together at a speed representing the rate of change of said bearing.

7. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for setting said bearing dial to the course of the ship, means for rotating said bearing dial manually within said compass dial for changes of course of said ship, means for setting both said dials together to the compass bearing and keel line bearing of said target respectively, and means for rotating both dials together at a speed representing the rate of change of said bearing.

8. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for rotating said bearing dial automatically within said compass dial for changes of course of said ship, means for setting both dials together to the compass bearing and the keel line bearing of said target respectively, and means for rotating both dials together at a speed representing the rate of change of said bearing.

9. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for normally constraining said target course dial to rotate at the same speed as said compass dial while said ship and said target are on a steady course, means for releasing such constraint when said target's course or said ship's course is changed, means for setting said bearing dial to the course of the ship, means for setting both said dials together to the compass bearing and the keel line bearing of said target respectively, and means for rotating both dials together at a speed representing the rate of change of said bearing.

10. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for normally constraining said target course dial to rotate at the same speed as said compass dial while said ship and said target are on a steady course, means for releasing such constraint when said target's course or said ship's course is changed, means for setting said bearing dial to the course of the ship, means for rotating said bearing dial within said compass dial for changes of course of said ship, means for setting both said dials together to the compass bearing and the keel line bearing of the target respectively, and means for rotating both dials together at a speed representing the rate of change of said bearing.

11. A range and bearing clock for indicating automatically the instantaneous bearing of a target relatively to a ship comprising a compass dial and a bearing dial within said compass dial, a target course dial fixed in said clock for indicating the angle between the course of said target and the line of sight, means for normally constraining said target course dial to rotate at the same speed as said compass dial while said ship and said target are on a steady course, means for releasing such constraint when said target's course or said ship's course is changed, means for setting said bearing dial to the course of the ship, means for rotating said bearing dial manually within said compass dial for changes of course of said ship, means for setting both said dials together to the compass bearing and the keel line bearing of said target respectively, and means for rotating both said dials together at a speed representing the rate of change of said bearing.

12. A range and bearing clock for indicating automatically the instantaneous bearing of a target relatively to a ship, comprising a compass dial and a bearing dial within said compass dial, a target course dial fixed in said clock for indicating the angle between the course of said target and the line of sight, means for normally constraining said target course dial to rotate at the same speed as said compass dial while said ship and said target are on a steady course, means for releasing such constraint when said target's course or said ship's course is changed, means for rotating said bearing dial automatically within said compass dial for changes of course of said ship, means for setting both dials together to the compass bearing and the keel line bearing of said target respectively, and means for rotating both dials together at a speed representing the rate of change of said bearing.

13. A range and bearing-clock for automatically indicating the instantaneous bearing of a target relatively to a ship, including a compass-dial, a bearing-dial juxtaposed to said compass-dial, means for setting the bearing-dial to the course of the ship, means for setting both of said dials in predetermined relation to each other and with respect to the compass-bearing and to the keel-line bearing of the target, respectively, and means for effecting movement of both of the dials in predetermined relation to each other and at a speed representing the rate of change of the bearing.

14. A range and bearing-clock for automatically indicating the instantaneous bearing of a target relatively to a ship, including a compass-instrumentality, a bearing-instrumentality juxtaposed to the compass-instrumentality, means for initially setting said bearing-instrumentality by the course of the ship, means for rotating the bearing-instrumentality in relation to the compass-instrumentality to correspond to changes of course of the ship, means for setting, in predetermined relation to each other, both of the instrumentalities relatively to the compass-bearing and to the keel-line bearing of the target, respectively, and means for rotating the instrumentalities in predetermined relation to each other and at a speed representing the rate of change of said bearing.

15. A range and bearing-clock for indicating the instantaneous bearing of a target relatively to a ship, including a compass-instrumentality, a bearing-instrumentality juxtaposed to the compass-instrumentality, means for setting said bearing-instrumentality by the course of the ship, means for rotating the bearing-instrumentality in relation to the compass-instrumentality to correspond to changes of course of the ship, means for setting, in predetermined relation to each other, both of the instrumentalities relatively to the compass-bearing, and means for rotating the instrumentalities in predetermined relation to each other and at a speed representing the rate of change of said bearing.

In testimony whereof we have hereunto set our hands in the presence of two subscribing witnesses.

ARTHUR H. POLLEN.
HAROLD ISHERWOOD.

Witnesses to the signature of the above named Arthur Hungerford Pollen:
NEL. O'HEA,
E. C. WALKER.

Witnesses to the signature of the above named Harold Isherwood:
GEORGE WILLIAM CURRY,
ALFRED HYNE PROCTER.